No. 814,931. PATENTED MAR. 13, 1906.
E. F. ATHEY.
GRAIN PAN FOR THRESHERS.
APPLICATION FILED FEB. 15, 1904.

2 SHEETS—SHEET 1.

No. 814,931. PATENTED MAR. 13, 1906.
E. F. ATHEY.
GRAIN PAN FOR THRESHERS.
APPLICATION FILED FEB. 15, 1904.

2 SHEETS—SHEET 2.

E. F. Athey,
Inventor

Witnesses
Otto E. Hoddick.
Dena S. Nelson.

Attorney

UNITED STATES PATENT OFFICE.

ELIJAH F. ATHEY, OF LUCERNE, COLORADO.

GRAIN-PAN FOR THRESHERS.

No. 814,931.

Specification of Letters Patent.

Patented March 13, 1906.

Application filed February 15, 1904. Serial No. 193,661.

*To all whom it may concern:*

Be it known that I, ELIJAH F. ATHEY, a citizen of the United States of America, residing at Lucerne, in the county of Weld and State of Colorado, have invented certain new and useful Improvements in Grain-Pans for Threshers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in grain-pans for threshers or machines for threshing grain and separating the kernels from the straw and chaff thereof.

This invention relates only to what I will term the "grain-pan" or the lower pan which receives the grain and a portion of the chaff and to which is imparted a vibratory movement, whereby the grain is separated from the chaff with which it is mingled and is therefore ready to be acted on by the fan as soon as it passes from the grain-pan to the screen in the rear of the latter.

My improved grain-pan is provided with a corrugated bottom, the corrugations being transversely arranged or arranged crosswise to the travel of the grain over the pan, the width of the corrugations being somewhat less than the stroke or movement of the pan in one direction under the vibratory or reciprocating action to which the pan is subjected, whereby as the pan moves rearwardly stops and immediately begins the rearward movement. The grain occupying one transverse recess or groove of the corrugated bottom is caused to travel at least from the transverse groove which it occupies into the next transverse groove, whereby there is a regular rearward travel of the grain over the corrugated surface of the grain-pan, all of which will be readily understood by reference to the accompanying drawings, in which is illustrated an embodiment thereof.

Figure 1:
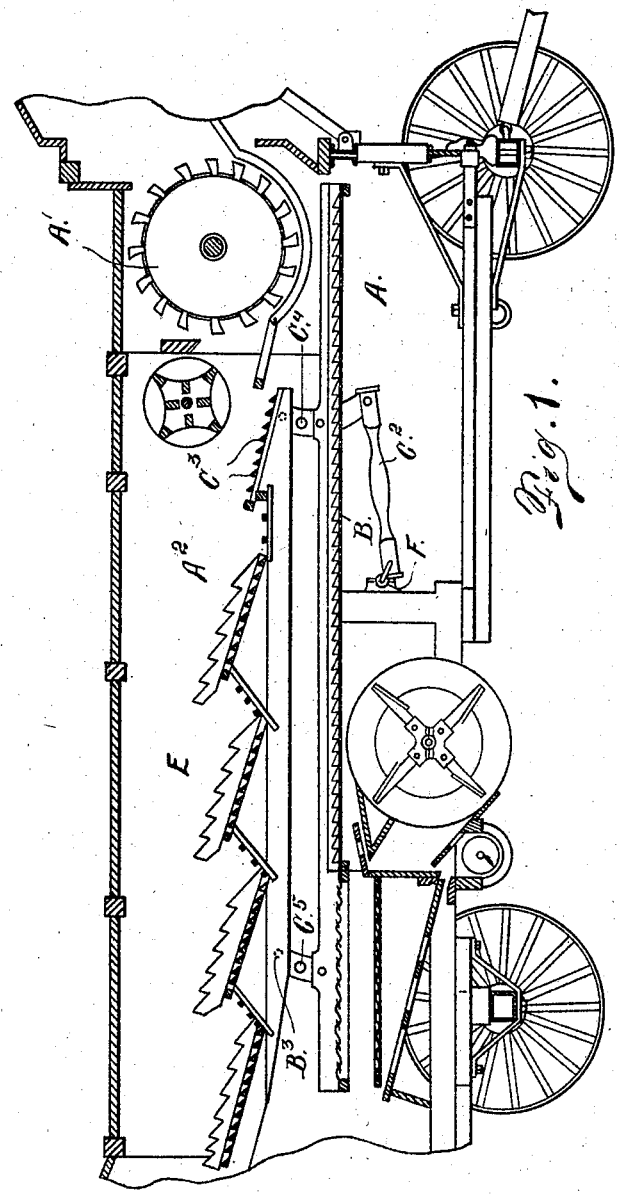
Figure 2:
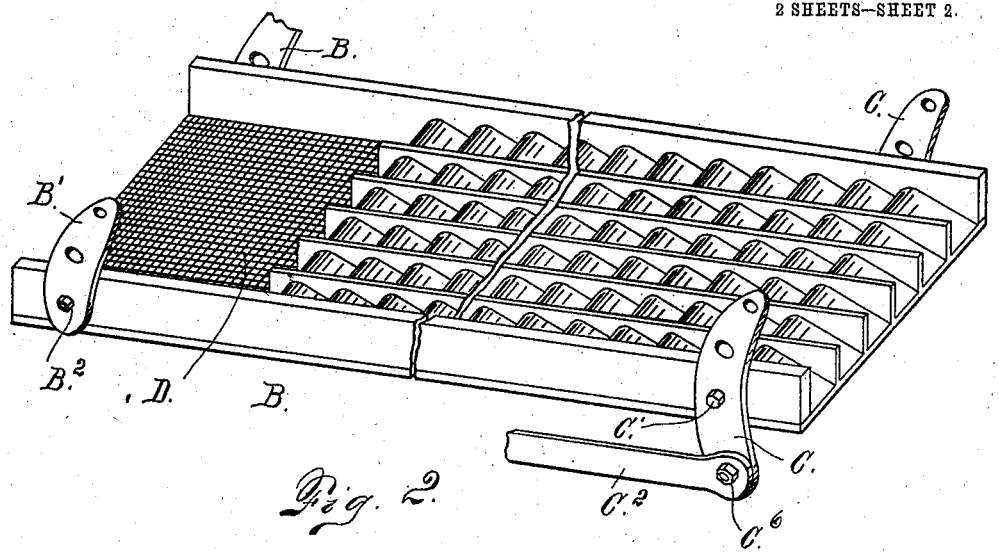
Figure 3:
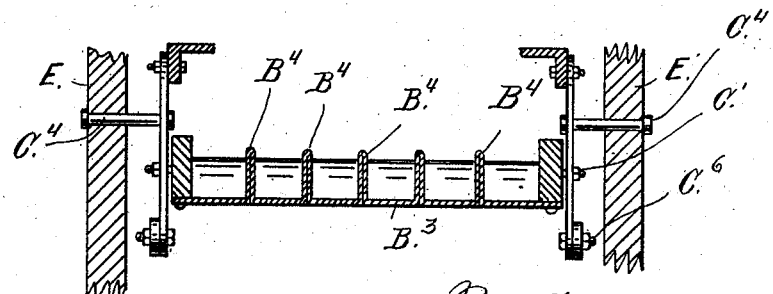
Figure 4:
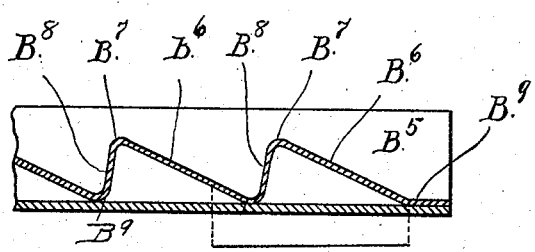

In the drawings, Figure 1 is a fragmentary view of a threshing-machine equipped with my improvements. Fig. 2 is a perspective view showing the grain-pan in detail and on a larger scale. Fig. 3 is a transverse section taken on the line 3 3, Fig. 2. Fig. 4 is a fragmentary longitudinal section taken on the line 4 4, Fig. 3.

The same reference characters indicate the same parts in all the views.

Let A designate the threshing-machine considered in its entirety; A', the cylinder thereof; $A^2$, the vibrating part, over which the straw passes and through or from which the grain passes to the grain-pan B below. This grain-pan, as shown in the drawings, is suspended at its rear extremities by means of levers B', pivotally connected at one end of the grain-pan frame, as shown at $B^2$. The forward extremity of the grain-pan is connected with levers C—one on each side—by means of bolts C'. Each of these levers C projects downwardly below the bolt C', and its lower extremity is pivotally connected with a pitman $C^2$, as shown at $C^6$, for imparting the vibratory movement to the pan. The upper extremities of the parts C and B' are pivotally connected with the straw carrier or support, as shown at $C^3$ and $B^3$, respectively. Each of the levers B' and C is fulcrumed on a stationary support E, as shown at $C^4$ and $C^5$, whereby as the pitman acts on the lever C to throw the grain-pan in one direction the straw-carrier $A^2$ is thrown in the opposite direction. In this way vibratory movement is imparted to both of the said instrumentalities.

As before indicated, the construction of the grain-pan is my only claim to novelty so far as the construction shown and described in this application is concerned. Hence it is the only feature or part of the machine which will be described in detail and claimed. This grain-pan is composed of a base or bottom $B^3$ and vertical longitudinally-disposed partitions $B^4$, formed integral with the bottom, by forming folds in the material or plate of which the bottom or body part of the pan is composed. Between these partitions are located corrugated members $B^5$, which are made fast to the bottom of the pan and consist of a series of corrugations each of which extends upwardly and rearwardly from the bottom of the pan, as shown at $B^6$, to a point $B^7$, which is highest, and from which point the corrugated part is bent abruptly downwardly to the bottom of the pan, as shown at $B^8$. The lower extremity of each part $B^6$ is designated $B^9$ in Fig. 4 of the drawings, from an inspection of which it will be observed that the corrugated part $B^5$ consists of a series of corrugated parts each consisting of a part extending upwardly and rearwardly from a point $B^9$ to the maximum elevation $B^7$, and thence abruptly downwardly, as shown at $B^8$, to another point $B^9$, from which last-named point another part $B^6$ commences. It will thus be seen that each element or part of the corrugated member is composed of a series of units all of which are substantially identical in construction. Each corrugated member $B^5$, as shown in the drawings, is composed of an integral piece of sheet metal stamped or otherwise suitably formed to fit in between the partitions $B^4$ of the grain-pan. As shown in the drawings, the length of each part $B^6$ is considerably greater than the length of each part $B^8$. Attention is also called to the fact that it is preferred that the horizontal distance between the points $B^9$ and $B^7$ of each element of each part $B^5$ shall be somewhat less than the length of the stroke imparted to the pan by the vibrating mechanism for the reason heretofore explained—that is to say, in order to cause the material occupying one unit of the corrugated member to pass from the said unit to the next unit in the rear every time the pan completes a reciprocation. The length of the stroke of the pan is indicated by the arrow-headed line located below Fig. 4 of the drawings. At least this line indicates a suitable length for the stroke. As the pan moves rearwardly, stops suddenly, and begins the reverse movement the material occupying each unit or transverse groove of the corrugation is carried from the said groove or unit into the adjacent rearward groove or unit, as heretofore explained. In this manner the material is given a predetermined travel on the grain-pan from the point where it engages the same until it passes to the screen D, which is connected with the grain-pan frame and located at the rear extremity of the corrugated part of the pan.

As shown in the drawings, the pitman $C^2$ is actuated from a crank-shaft F, (see Fig. 1,) the crank-shaft being actuated from any suitable means. (Not shown.)

Having thus described my invention, what I claim is—

1. A vibratory grain-pan having a sheet-metal bottom provided with vertical, longitudinally-disposed partitions formed integral with the bottom of the pan and consisting of folds formed in the plate of which the bottom is composed, and corrugated parts mounted on the bottom between the partitions and having their grooves or valleys arranged in a direction crosswise of the pan or in a direction at right angles to the travel of the material thereon, the extent of the corrugations in the direction of the pan's length being somewhat less than the length of the stroke in one direction due to the vibratory movement of the pan.

2. The combination of a grain-pan, and means for imparting a longitudinal vibration or reciprocation thereto, the said pan consisting of a bottom having vertical longitudinally-disposed partitions formed integral therewith, and corrugated longitudinally-extending members mounted on the bottom of the pan between the partitions, and having their grooves or valleys arranged crosswise of the pan or extending in a direction crosswise of the travel of the material thereon, the length of the units of the corrugations being somewhat less than the length of the stroke of the pan in one direction.

In testimony whereof I affix my signature in presence of two witnesses.

ELIJAH F. ATHEY.

Witnesses:
 DENA NELSON,
 HILMER BERGSTROM